US011709711B2

(12) United States Patent
Krishnan

(10) Patent No.: US 11,709,711 B2
(45) Date of Patent: Jul. 25, 2023

(54) ALLOCATION OF MEMORY ACCESS BANDWIDTH TO CLIENTS IN AN ELECTRONIC DEVICE

(71) Applicant: Advanced Micro Devices, Inc., Santa Clara, CA (US)

(72) Inventor: Guhan Krishnan, Acton, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 262 days.

(21) Appl. No.: 17/120,215

(22) Filed: Dec. 13, 2020

(65) Prior Publication Data

US 2022/0100567 A1     Mar. 31, 2022

Related U.S. Application Data

(60) Provisional application No. 63/083,994, filed on Sep. 27, 2020.

(51) Int. Cl.
| G06F 9/46 | (2006.01) |
| G06F 9/50 | (2006.01) |
| G06T 1/60 | (2006.01) |
| G06F 13/16 | (2006.01) |

(52) U.S. Cl.
CPC .......... *G06F 9/5016* (2013.01); *G06F 9/5022* (2013.01); *G06F 13/1668* (2013.01); *G06T 1/60* (2013.01)

(58) Field of Classification Search
CPC .. G06F 9/5016; G06F 9/5022; G06F 13/1668; G06T 1/60
See application file for complete search history.

(56) References Cited

U.S. PATENT DOCUMENTS

| 7,296,139 | B1 * | 11/2007 | Case | ................... | G06F 12/0897 |
| | | | | | 711/E12.043 |
| 2004/0268363 | A1 * | 12/2004 | Nace | ........................ | G06F 9/54 |
| | | | | | 719/312 |
| 2018/0018097 | A1 * | 1/2018 | Kazakov | ............... | G06F 3/0673 |
| 2019/0065374 | A1 * | 2/2019 | Hower | ................ | G06F 13/1663 |

* cited by examiner

*Primary Examiner* — Gregory A Kessler
(74) *Attorney, Agent, or Firm* — Park, Vaughan, Fleming & Dowler LLP

(57) ABSTRACT

An electronic device includes a memory; a plurality of clients; at least one arbiter circuit; and a management circuit. A given client of the plurality of clients communicates a request to the management circuit requesting an allocation of memory access bandwidth for accesses of the memory by the given client. The management circuit then determines, based on the request, a set of memory access bandwidths including a respective memory access bandwidth for each of the given client and other clients of the plurality of clients that are allocated memory access bandwidth. The management circuit next configures the at least one arbiter circuit to use respective memory access bandwidths from the set of memory access bandwidths for the given client and the other clients for subsequent accesses of the memory.

20 Claims, 5 Drawing Sheets

ALLOCATION OF MEMORY ACCESS BANDWIDTH TO CLIENTS IN AN ELECTRONIC DEVICE

RELATED APPLICATIONS

This application claims priority to U.S. provisional application No. 63/083,994, which was filed on 27 Sep. 2020, and which is incorporated by reference herein.

BACKGROUND

Related Art

In many electronic devices, groups of functional blocks interact for performing operations. For example, functional blocks such as central processing units (CPUs), graphics processing units (GPUs), display interfaces, imaging/camera interfaces, and input-output (I/O) elements can work together to present, on a display (e.g., a head-mounted display worn by a user), virtual reality (VR) or augmented reality (AR) information. Performing such operations often requires some or all of the functional blocks to access (i.e., read, write, etc.) data—and possibly large amounts of data—in a memory in the electronic devices. Continuing the VR/AR example, the central processing unit can access memory when performing operations for a computer vision processing application, the graphics processing unit can access memory for generating frames of AR/VR video for presentation on the display, and so forth. In some cases, the operations performed by the functional blocks are hampered by longer latency in memory accesses. Some of the functional blocks are sufficiently sensitive to longer latency in memory accesses that user-perceptible artifacts can occur with longer memory latencies. Again continuing the AR/VR example, when certain functional blocks encounter longer latency memory accesses, user-perceptible video artifacts such as tearing, jitters, reduced resolution, and dropped frames can occur. As another example, when functional blocks that are decoding audio experience higher memory access latency, the output audio can include drops, pops, reduced fidelity, etc.

In order to avoid the above-described user-perceptible artifacts due to latency in memory accesses, some electronic devices allocate memory access bandwidth to functional blocks. In other words, in these electronic devices, portions (e.g., 5 GB/s, 10 GB/s, etc.) of a full access bandwidth of a memory (e.g., 80 GB/s, 100 GB/s, etc.) are reserved for the exclusive use of given functional blocks. Other functional blocks are prevented from using allocated memory access bandwidth for the given functional block. For example, in some electronic devices, functional blocks, or "clients" of the memory, are considered hard real time clients, soft real time clients, or non-real time clients. Hard real time clients are functional blocks that have higher sensitivity to latency in memory accesses—and for which user-perceptible artifacts resulting from higher latency memory accesses are often regarded by users as errors or incorrect operation (e.g., ongoing or larger-scale audible artifacts in output audio, ongoing or larger-scale tearing, jitters, or frame dropping in output video, etc.). Soft real time clients are functional blocks that have intermediate sensitivity to latency in memory accesses—and for which user-perceptible artifacts resulting from higher latency memory accesses are less likely to be regarded as errors by users (the artifacts may be annoying to users, but tolerated). Non-real time clients are functional blocks that have lower sensitivity to latency in memory accesses—and can often operate without user-perceptible errors despite higher memory access latency. Memory access bandwidth can be allocated to both hard real time clients and soft real time clients in order to ensure that hard real time clients and the soft real time clients have sufficient memory access bandwidth to avoid user-perceptible artifacts. On the other hand, memory access bandwidth is typically not allocated to non-real time clients. Non-real time clients therefore vie with each other for non-allocated memory access bandwidth.

In some electronic devices, memory access bandwidth allocations to clients (e.g., hard real time clients and soft real time clients) are "static." The memory access bandwidth allocated to each client therefore remains assigned to that client for the duration of that client's operations. For example, a client such as a display interface may have a fixed memory access bandwidth allocated at startup and that memory access bandwidth allocation may be maintained for as long as the display interface is operational. In many cases, the static allocations of memory access bandwidth are sufficiently large to account for the "worst-case" memory access bandwidth consumption of the clients. In other words, clients are allocated memory access bandwidth sufficient to perform the clients' expected worst-case memory accesses in order to be sure of avoiding user-perceptible artifacts (e.g., 8 GB/s, 25 GB/s, etc.). It commonly occurs, however, that clients only periodically use the full allocated memory access bandwidth. The memory access bandwidth allocated to the client can go unused for at least some (and possibly much) of the time the electronic device is operating.

Although non-real time clients are not typically sources of user-perceptible artifacts, despite higher memory access latencies, in some cases, non-real time clients perform operations for which the non-real time clients are more sensitive to memory access latency and memory bandwidth. For example, a non-real time client such as a graphics processing unit may execute a video processing job that causes the graphics processing unit to briefly perform larger numbers of memory accesses for generating frames of AR/VR video. In other words, for much of the time, the graphics processing unit can operate without user-perceptible artifacts despite higher memory access latencies and thus is correctly considered as a non-real time client. For a smaller portion of the graphics processing unit's operation, however, the designation of non-real time is less appropriate. In such cases, due to the static allocation of memory access bandwidth to hard real time clients and soft real time clients, non-real time clients may encounter longer latency in memory accesses (due to vying for remaining/non-allocated memory access bandwidth with other non-real time clients) and thus may be the source of user-perceptible artifacts.

BRIEF DESCRIPTION OF THE FIGURES

Throughout the figures and the description, like reference numerals refer to the same figure elements.

DETAILED DESCRIPTION

Figure 1:
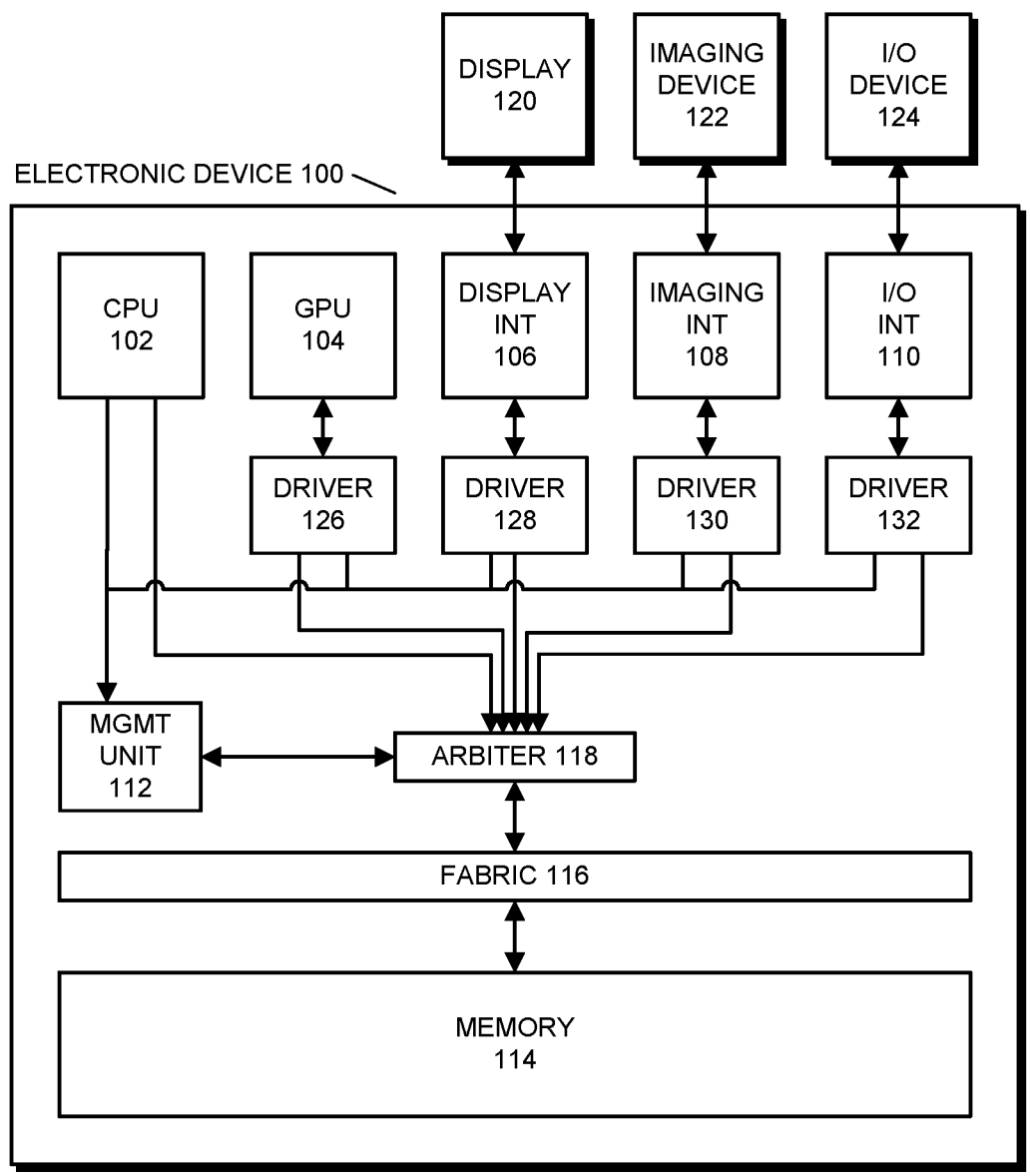
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of the terms. Note that these terms may have significant additional aspects that are not recited herein for clarity and brevity and thus the description is not intended to limit the terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Bandwidth: bandwidth refers to a functional block's available capacity for performing or ability to perform specified operations. For example, a memory may have a memory access bandwidth of N GB/s, where N is 100, 2000, or another number of GB/s. In other words, when operating at a given memory access speed or capacity (e.g., a full access speed or capacity), the memory is able to perform memory accesses (e.g., reads and/or writes) that total N GB/s. In some cases, the bandwidth of a functional block can be divided or partitioned and the separate divisions or partitions can be allocated to different clients. For example, divisions or partitions of the memory access bandwidth of a memory may be allocated to clients such as central processing units, display interfaces, etc. In this case, allocating a division or a partition of the memory access bandwidth to a given client means that the given client is provided with the specified fraction or portion of the memory access bandwidth—and other clients are prevented from using the specified fraction or portion of the memory access bandwidth. In some cases, the allocation of a division or a partition of a functional block's bandwidth to a given client does not mean that the given client is continuously using the division or partition of the functional block's bandwidth.

Hard real time clients: hard real time clients are memory access clients (e.g., functional blocks) in an electronic device that have higher sensitivity to latency in memory accesses. For hard real time clients, reduced memory access bandwidth, and thus increased memory access latency, can result in user-perceptible artifacts and errors that a user may regard as improper or erroneous operation of the electronic device, such as ongoing or larger-scale audible artifacts in output audio partially or wholly generated by the client, ongoing or larger-scale tearing, jitters, or frame dropping in output video partially or wholly generated by the client, etc. In some cases, hard real time clients are allocated memory access bandwidth to avoid issues with user-perceptible artifacts and/or errors.

Soft real time clients: soft real time clients are memory access clients (i.e., functional blocks) in an electronic device that have intermediate sensitivity to latency in memory accesses. For soft real time clients, reduced memory access bandwidth, and thus increased memory access latency, can result in user-perceptible artifacts and errors that a user will normally ignore or regard as an acceptable (albeit possibly annoying) part of the operation of the electronic device, such as infrequent and smaller-scale audible artifacts in output audio partially or wholly generated by the client, infrequent and smaller-scale tearing, jitters, or frame dropping in output video partially or wholly generated by the client, etc. In some cases, soft real time clients are allocated memory access bandwidth to avoid issues with user-perceptible artifacts and/or errors.

Non-real time clients: non-real time clients are memory access clients (i.e., functional blocks) in an electronic device that have lower sensitivity to latency in memory accesses. For non-real time clients, reduced memory access bandwidth, and thus increased memory access latency, will normally not cause more than minimal user-perceptible artifacts and errors. In some cases, due to the tolerance for memory access latency, non-real time clients are not allocated memory access bandwidth and thus vie for memory access bandwidth with other clients that are not allocated memory access bandwidth. Non-real time clients, however, may perform operations or sub-operations thereof for which the non-real time clients are more sensitive to memory access latency. For example, a non-real time client such as a graphics processing unit may execute a video processing job that causes the graphics processing unit to periodically perform a larger number of memory accesses and/or that makes the graphics processing unit more sensitive to memory access latency.

Overview

In the described embodiments, an electronic device includes a memory (e.g., a main memory) and a set of clients that can access the memory. For example, the clients can include some or all of central processing units (CPUs), graphics processing units (GPUs), display interfaces, imaging interfaces, and input/output interfaces. The electronic device also includes at least one arbiter that enforces memory access bandwidth allocations for some or all of the clients in order to control access to the memory by the clients. In other words, some or all of the clients are provided with memory access bandwidth allocations, which are memory access bandwidths such as X GB/s (where X=10, 7, or another number) that are reserved for the exclusive use of the client to which they are allocated. The electronic device also includes a management entity that performs operations for dynamically allocating/reallocating memory access bandwidth to clients in the set of clients. In other words, the management entity allocates and reallocates memory access bandwidth at runtime, as the electronic device operates (in contrast to statically allocated memory access bandwidths which are allocated at a given time and retained during operation). Generally, the management entity, based on requests received from clients requesting the allocation of memory access bandwidth, selects sets of memory access bandwidths in which an available memory access bandwidth of the memory is apportioned to requesting clients and other clients that are to be provided with allocations of memory access bandwidth. The management entity then configures the at least one arbiter to use the sets of memory access bandwidths for the requesting clients and the other clients for subsequent memory accesses. Clients that are not allocated memory access bandwidth vie for a remaining/non-allocated memory access bandwidth.

Note that, for clarity and brevity, clients are described herein as requesting the allocation of memory access bandwidth from a management entity. In some embodiments, however, the clients themselves (i.e., the hardware or circuitry of hardware clients) do not send the requests to the management entity. For example, in some embodiments, drivers for the clients communicate requests for the allocation of memory access bandwidth to the management entity. As another example, in some embodiments, hardware or software entities acting on behalf of the clients communicate requests for the allocation of memory access bandwidth to the management entity. Generally, in the described embodiments, requests for the allocation of memory access bandwidth for clients are received by the management entity and acted on by the management entity as described herein.

For dynamically assigning memory access bandwidths to clients, a given client (e.g., a graphics processing unit, etc.) first communicates a request to the management entity requesting allocation of memory access bandwidth to be used by the given client. For example, when a client's use case changes (where the "use case" is or includes a given workload profile, type of operation(s), type of memory access(es), etc.), the client can request allocation of memory access bandwidth for the use case—and the changing of the use case can serve as a cause or trigger for making the request. For instance, a user may initiate an operation such as turning on a device or starting a given operation (e.g., streaming video, etc.) which causes a client's use case to change, leading to the client making a request for the allocation of memory access bandwidth. In some embodiments, the request identifies the given client and a use case for the given client, with the use case being or being associated with operation(s) for which the given client is requesting the memory access bandwidth. The management entity then determines, based on the request (and possibly other considerations), a set of memory access bandwidths including a respective memory access bandwidth for each of the given client and other clients of the multiple clients that are presently allocated memory access bandwidth. Generally, the set of memory access bandwidths includes a memory access bandwidth allocation for each of the given client and the other clients, such as one or more divisions or partitions of an available memory access bandwidth of the memory. For example, assuming that the available memory access bandwidth of the memory is M GB/s of an N GB/s memory access bandwidth capacity (e.g., M=70 GB/s and N=100 GB/s) and that there are K clients to be allocated memory access bandwidth, the set of memory access bandwidths can be evenly divided among the K clients and thus be M/K GB/s, or can be otherwise divided among the K clients in accordance with the respective use cases, allocation rules, client priority, etc. In some embodiments, for determining the set of memory access bandwidths, the management entity looks up the set of memory access bandwidths in a lookup table or otherwise generates or computes the set of memory access bandwidths. The management entity next configures the at least one arbiter to use the respective access bandwidths from the set of access bandwidths for the given client and the other clients for subsequent accesses of the memory. For example, the management entity and/or the at least one arbiter updates a per-client table or other record or configuration value in the at least one arbiter that is used by the at least one arbiter to determine memory access bandwidths to be provided to the given client, the other clients, and any remaining clients (i.e., clients without memory access bandwidth allocations). The at least one arbiter then uses the respective access bandwidths from the set of access bandwidths for the given client and the other clients for subsequent accesses of the memory—and any remaining clients vie for a remainder/non-allocated portion of the memory access bandwidth.

In some embodiments, in addition to requesting the allocation of the memory access bandwidth, a client can request the release of a previously-allocated allocation of memory access bandwidth. For example, a client may release an allocation of memory access bandwidth upon completing an operation for which the allocation was previously requested. In these embodiments, given client (e.g., a graphics processing unit, etc.) communicates a request to the management entity requesting the release of a previously-allocated allocation of memory access bandwidth. The management entity then determines, based on the request (and possibly other considerations), a set of memory access bandwidths including a respective memory access bandwidth other clients of the multiple clients that are presently allocated memory access bandwidth using operations similar to those described above. The management entity next configures the at least one arbiter to use the respective access bandwidths from the set of access bandwidths for the other clients for subsequent accesses of the memory. In some embodiments, after releasing the allocation of memory access bandwidth, the given client vies for a remainder/non-allocated portion of the memory access bandwidth along with other clients that have no allocated memory access bandwidth.

In some embodiments, the management entity is a hardware functional block (i.e., is implemented using circuitry, and possibly dedicated or purpose-specific circuitry). For example, in some embodiments, the hardware functional block is or includes circuitry in a system management unit and/or in arbiter(s) in the electronic device. In these embodiments, and continuing the example above, drivers for clients or circuitry in the clients communicate requests for the allocation of memory access bandwidth to the hardware functional block. The hardware functional block then determines sets of memory access bandwidths and configures the arbiter(s) to use the sets of memory access bandwidths for the clients and other clients as described above.

In some embodiments, the management entity includes a combination of a software entity and a hardware functional block. For example, in some embodiments, the software entity is a firmware, kernel space, or a user space program, application, or routine, and the hardware functional block is or includes circuitry in a system management unit or in arbiter(s) in the electronic device. In these embodiments, and continuing the example above, drivers for clients or circuitry in the clients communicate requests for the allocation of memory access bandwidth to the software entity. The software entity then determines sets of memory access bandwidths and configures the arbiter(s) to use the sets of memory access bandwidths for the client and other clients as described above. In some embodiments, configuring the arbiter(s) involves the software entity itself/directly configuring the arbiter(s) to use the sets of memory access bandwidths—and configuration circuitry in the arbiter(s) is/are the hardware functional block. In some embodiments, configuring the arbiter(s) involves the software entity sending a request or message to the hardware functional block (e.g., a system management unit), which then configures the arbiters to use the sets of memory access bandwidths for the client and other clients as described above. In some of these embodiments, the software entity uses an interrupt and/or mailbox memory mechanism for communicating the sets of memory access bandwidths to the hardware functional block.

In some embodiments, non-real time clients can request and be allocated memory access bandwidth. Recall that in existing electronic devices hard real time and soft real time clients may be allocated memory access bandwidths (and thus may have memory access bandwidth reserved for their exclusive use), but non-real time clients are not allocated memory access bandwidths. The non-real time clients in existing electronic devices are therefore forced to vie for the remaining memory access bandwidth that is not allocated to hard real time and soft real time clients. For allocating memory access bandwidth to non-real time clients, the management entity receives requests for the allocation of memory access bandwidth from the non-real time clients, determines sets of memory access bandwidths, and configures the arbiter(s) to use the sets of memory access bandwidths for the non-real time client and other clients as described above.

In some embodiments, in order to allocate memory access bandwidth to non-real time clients, the management entity determines sets of memory access bandwidths in which the memory access bandwidths provided to some or all hard real time and/or soft real time clients is reduced. For example, the management entity can take into account use cases for all clients that are to be allocated memory access bandwidth and select a set of memory access bandwidths that repurposes memory access bandwidths for hard real time clients and/or soft real time clients that are presently using less than all of their allocated memory access bandwidth. In other words, the management entity can "take" or "borrow" memory access bandwidth from the hard real time or soft real time clients to be provided to and thus used by the non-real time client. The memory access bandwidth can then be returned to the hard real time clients and/or the soft real time clients when (and if) subsequently released by the non-real time client. In some embodiments, because hard real time clients and/or soft real time clients are allocated "worst case" memory access bandwidth that may not be consumed at all times, the repurposing of the memory access bandwidth does not interfere with the overall operation of the hard real time and/or soft real time clients.

In some embodiments, as part of configuring the arbiter(s) to use the respective access bandwidths from a set of access bandwidths for accessing the memory, the management entity causes the arbiter(s) to temporarily halt memory accesses (e.g., by holding buffered memory accesses and buffering newly arriving memory accesses). The management entity then updates records or settings in the arbiter(s) so that the arbiter(s) use the respective access bandwidths from a set of access bandwidths. For example, the management entity can update a per-client table or other record or configuration value in each arbiter that is used by that arbiter to determine memory access bandwidths to be provided to the clients with memory access bandwidth allocations as well as clients without memory access bandwidth allocations (which use the remaining memory access bandwidth). The management entity then causes the arbiter(s) to resume memory accesses using the respective access bandwidths from a set of access bandwidths.

In some embodiments, some or all of the clients in the electronic device interact for performing operations for presenting virtual reality (VR) or augmented reality (AR) information on displays (e.g., headsets, etc.). For example, central processing units, graphics processing units, display interfaces, imaging interfaces, and/or input/output interfaces can perform respective parts of the operations for presenting streams video (i.e., sequences of individual video frames) that include or are composed using the VR or AR information. In some of these embodiments, some of the clients are treated as hard real time or soft real time clients due to an increased possibility of user-perceptible artifacts or errors in the streams of video (e.g., tearing, jitters, frame drops, low resolution, etc.). Others of the clients, however, are treated as non-real time clients.

In some embodiments, clients that are otherwise non-real time clients can request allocation of memory access bandwidth for particular sub-operations—and then release the allocated memory access bandwidth when the sub-operations are completed. Continuing the VR/AR example above, a graphics processing unit may be treated as a non-real time client, and thus may not have memory access bandwidth allocated to it, but may request the temporary allocation of memory access bandwidth for performing video frame composition operations for a video stream, etc. In these embodiments, the otherwise non-real time clients can request the allocation of memory access bandwidth and release the allocation of memory access bandwidth using the above-described operations.

In some embodiments, the above-described non-real time clients that request allocation of memory access bandwidth for sub-operations can perform operations for determining when the memory access bandwidth is to be requested. For example, a given (non-real time) client can determine a request time in advance of a time at which the given client is to commence the specified job for communicating the request to the management entity so that the access bandwidth is allocated at the time at which the given client commences the specified job. In other words, via monitoring operational timing, using configuration values, performing a lookup in a record, etc., the given client determines when a request should be made to the management entity so that memory access bandwidth is allocated to the given client and thus available/ready for performing the specified job.

By configuring the arbiter(s) to use sets of memory access bandwidth for clients as described above, the management entity can dynamically update allocations of memory access bandwidth for the clients. This includes providing non-real time clients, which are not allocated memory access bandwidth in existing devices (and thus must vie for remaining memory access bandwidth), with the opportunity to request and be provided memory access bandwidth allocations. The management entity can therefore be more responsive to the memory access needs of all types of clients, while retaining, to an extent, protection of memory access bandwidth for hard real time clients and soft real time clients. Because clients can secure reserved memory access bandwidth, clients are better able to ensure memory accesses will proceed unhindered by memory accesses being made by other clients—and can avoid some of the latency and other issues associated with performing memory accesses without allocated/reserved memory access bandwidth. The clients can therefore operate more efficiently and with less user-perceptible issues, which improves the operation of the electronic device. Improving the operation of the electronic device can improve user satisfaction with the electronic device.

Electronic Device

FIG. 1 presents a block diagram illustrating electronic device 100 in accordance with some embodiments. As can be seen in FIG. 1, electronic device 100 includes central processing unit (CPU) 102, graphics processing unit (GPU) 104, display interface (DISPLAY INT) 106, imaging interface (IMAGING INT) 108, input-output interface (I/O INT) 110, management (MGMT) unit 112, memory 114, fabric 116, and arbiter 118. Generally, central processing unit 102, graphics processing unit 104, display interface 106, imaging interface 108, input-output interface 110, management unit 112, memory 114, fabric 116, and arbiter 118 are all implemented in "hardware," i.e., using corresponding circuitry. For example, in some embodiments, central processing unit 102, graphics processing unit 104, display interface 106, imaging interface 108, input-output interface 110, management unit 112, memory 114, fabric 116, and arbiter 118 are fabricated in integrated circuitry on one or more semiconductor chips, possibly on one or more separate semiconductor chips, are fashioned from semiconductor chips in combination with discrete circuitry, and/or are fabricated from discrete circuitry alone. As described herein, some or all of central processing unit 102, graphics processing unit 104, display interface 106, imaging interface 108, input-output interface 110, management unit 112, memory 114, fabric 116, and arbiter 118 perform operations associated with allocating memory access bandwidth to clients in electronic device 100, where the "clients" include functional blocks such as central processing unit 102, graphics processing unit 104, display interface 106, imaging interface 108, input-output interface 110, etc.

Electronic device 100 also includes or is communicatively coupled to display 120, imaging device 122, and input-output (I/O) device 124. Display 120 is or includes a functional block, element, and/or device on which information can be displayed to a user such as a display screen, AR/VR headset, and/or computer monitor. Imaging device 122 is or includes a functional block, element, and/or device that captures images of or other information about an environment of electronic device 100 such as a video camera, a still camera, a LIDAR or other depth sensor. Input-output device 124 is or includes a functional block, element, and/or device that receives or provides data to electronic device 100 such as a disk drive, sensor, network interface, microphone and/or speaker, human interface device (e.g., controller, keyboard, mouse, motion detection camera, etc.) etc. In some embodiments, some or all of display 120, imaging device 122, and input-output device 124 are integrated into electronic device 100, such as with a built-in camera and display, etc. In some embodiments (such as the embodiment shown in FIG. 1), some or all of display 120, imaging device 122, and input-output device 124 are external to into electronic device 100, such as with an AR/VR headset including a display and a camera communicatively coupled to electronic device 100 via a wired connection, etc.

Returning to the functional blocks within electronic device 100, central processing unit 102 is a functional block that performs computational, memory access, and other operations (e.g., control operations, configuration operations, etc.) in electronic device 100. For example, central processing unit 102 can be or include one or more microprocessors, CPU cores, application specific integrated circuits (ASICs), field programmable gate arrays (FPGAs), and/or other processing elements or devices.

Graphics processing unit 104 is a functional block that performs computational, memory access, and other operations (e.g., control operations, configuration operations, etc.) associated with graphics processing (e.g., rendering, etc.) and/or general purpose computational operations. For example, graphics processing unit 104 can be or include one or more general purpose graphics processing unit (GPGPU) cores, application specific integrated circuits (ASICs), field programmable gate arrays (FPGAs), and/or other processing elements or devices.

Display interface 106 is a functional block that performs operations associated with providing information to display 120 to be displayed to a user. For example, in some embodiments, display interface 106 includes buffers/queues, transceivers, etc. for retrieving frames of video (e.g., a stream of video frames) from memory 114 and providing the frames of video to display 120 for display thereon.

Imaging interface 108 is a functional block that performs operations associated with receiving images and/or other information (e.g., depth information, reflectivity information, radar or LIDAR information, etc.) from imaging device 122. For example, in some embodiments, imaging interface 108 includes buffers/queues, transceivers, etc. for receiving images or streams/sequences thereof from imaging device 122 and storing the images or streams/sequences thereof in memory 114.

Input-output interface 110 is a functional block that performs operations of an input-output hub or bridge that interfaces between input-output devices (e.g., input-output device 124) and other functional blocks in electronic device 100. The operations performed by input-output interface 110 include operations for ensuring that communications received from the input-output devices properly reach other functional blocks, that the input-output devices are permitted to communicate with the other functional blocks, etc. For example, in some embodiments, input-output interface 110 includes buffers/queues, transceivers, etc. for receiving data from input-output device 124 and storing the data in memory 114.

Management unit 112 is a functional block that performs operations for controlling various operations of electronic device 100. For example, in some embodiments, management unit 112 is a system management unit that controls operating states for other functional blocks, regulates temperatures, etc. For example, management unit 112 may include microcontrollers, FPGAs, etc. that monitor other functional blocks and place other the functional blocks in sleep or powered-down states when the other functional blocks are idle or that monitor temperatures of other functional blocks and devices/elements in electronic device 100 and adjust fan speeds accordingly. In some embodiments, management unit 112 performs operations for allocating memory access bandwidth to other functional blocks, called memory access "clients," in electronic device 100. In these embodiments, management unit 112 receives requests for the allocation of memory access bandwidth from a client such as graphics processing unit 104, imaging interface 108, etc. (i.e., from the client itself, from a driver associated with the client, and/or from another hardware or software entity acting on behalf of the client) and configures arbiter 118 to use sets of memory access bandwidths that are determined based on the request. The operations of management unit 112 for allocating memory access bandwidths to clients are described in more detail below.

Memory 114 is functional block that performs operations of a memory (e.g., a "main" memory) in electronic device 100. Memory 114 includes volatile memory circuitry such as fourth-generation double data rate synchronous DRAM (DDR4 SDRAM) memory circuitry for storing copies of instructions and data for use by the other functional blocks in electronic device 100 and control circuitry for storing, accessing, etc. copies of instructions and data in the memory circuitry and for performing other control or configuration operations. As described herein, memory 114 has a full or maximum memory access bandwidth, which is a maximum rate at which memory 114 is able to perform memory accesses (e.g., reads, writes, moves, etc.). For example, the full or maximum memory access bandwidth can be 100 GB/s, 2000 GB/s, or another value. In addition, in some embodiments, memory 114 has a maximum allocatable memory access bandwidth, which is a limit on the amount of the full or maximum memory access bandwidth that can be allocated. For example, assuming that the full or maximum memory access bandwidth is 80 GB/s, the maximum allocatable memory access bandwidth can be 64 GB/s, 70 GB/s, or another value.

Fabric 116 is a functional block that includes communication routes that are used for communicating instructions, data, control signals, and/or other information between other functional blocks in electronic device 100. Fabric 116 includes one or more serial or parallel buses (e.g., wires, guides, etc.) and circuitry (e.g., transmitters, receivers, buffers, repeaters, optical elements, etc.) that are used for communicating the instructions, data, etc. between the functional blocks. In some embodiments, communication traffic (e.g., packets, signals, messages, etc.) communicated between functional blocks using fabric 116 is arranged, formatted, and handled in accordance with one or more protocols or standards such as the Infinity Fabric standard from Advanced Micro Devices, Inc. of Santa Clara, Calif.

Arbiter 118 is a functional block that performs operations for controlling accesses (e.g., reads, writes, copies, moves, metadata reads or writes, etc.) of data in memory 114 by other functional blocks in electronic device 100. Arbiter 118, given a maximum access bandwidth of memory 114 and memory access bandwidth allocations, monitors memory accesses being performed by the other functional blocks, enforces the allocations of memory access bandwidth (i.e., prevents functional blocks from encroaching on memory access bandwidth allocated to, and thus reserved for, a given functional block), and distributes any remaining/unallocated memory access bandwidth within the maximum access bandwidth among functional blocks that do not have memory access bandwidths allocated. Note that "data" as used herein is a generic term that includes any type or arrangement of information that can be stored in memory 114, such as actual data, instructions, configuration values, metadata values that are associated with data stored in memory 114, etc.

In some embodiments, arbiter 118 includes configuration elements such as memory circuitry for storing tables or records, configurable circuitry (i.e., comparators, registers, etc.), etc. that can be set and reset to cause arbiter 118 to use allocated memory access bandwidths for respective functional blocks. For example, in some embodiments, arbiter 118 receives set of memory access bandwidths including a respective memory access bandwidth that is allocated to each of one or more clients (i.e., other functional blocks) and stores the set of access bandwidths in the configuration elements and/or uses values from the set of access bandwidths to update the configuration elements so that arbiter 118 subsequently uses the respective memory access bandwidths for controlling memory accesses by these clients (and other clients). Generally, using the set of memory access bandwidths for controlling memory accesses involves ensuring that memory access bandwidths allocated to clients are reserved for the exclusive access of those clients—and distributing a remaining memory access bandwidth among other clients in accordance with a memory access request handling scheme (e.g., in order of memory access requests, round robin, by client priority, etc.). For example, arbiter 118 can monitor memory accesses for all clients to determine the bandwidth consumed performing memory accesses for the individual clients (e.g., in GB/s or another measure) and can balance/limit the memory accesses for the clients so that the memory access bandwidth reserved for particular clients is not used by another client (or clients). For instance, when a given client is likely to encroach on an allocated memory access bandwidth, arbiter 118 can slow down/throttle or temporarily halt memory accesses for the given client.

In some embodiments, central processing unit 102 (or another functional block) executes software drivers, shown as drivers 126-132, that intercede between functional blocks in electronic device 100 and an operating system executed by central processing unit 102 and/or software (e.g., applications, firmware, etc.) executed by other functional blocks. Generally, drivers 126-132 function as intermediaries between the hardware (i.e., circuitry, devices, elements, etc.) of the respective functional blocks and the operating system, formatting and forwarding communications (e.g., requests, events, error messages, interrupts, data, etc.) from the respective functional blocks to the operating system and/or the software executed by the other functional blocks and vice versa. In some embodiments, drivers 126-132 communicate requests for the allocation of memory access bandwidth to management unit 112 and/or other functional blocks for handling therein. Note, however, that, in some embodiments, some or all of drivers 126-132 are not used for communicating requests for the allocation of memory access bandwidth (although the drivers 126-132 may perform other operations). For example, in some embodiments, circuitry in the functional block performs operations for communicating the requests.

Electronic device 100 is simplified for illustrative purposes. In some embodiments, however, electronic device 100 includes additional or different functional blocks, subsystems, and/or elements. For example, electronic device 100 may include power subsystems, etc. In addition, although electronic device 100 is shown with certain functional blocks and elements, in some embodiments, electronic device 100 includes different functional blocks or elements. For example, in some embodiments, electronic device 100 includes a different number of central processing units and/or graphics processing units. Also, although electronic device 100 is shown with functional blocks and elements arranged in a particular way, in some embodiments, the functional blocks are differently arranged. For example, in some embodiments, display interface 106 and/or imaging interface 108 are themselves input-output devices and thus input-output interface 110 intervenes between display interface 106 and/or imaging interface 108 and other functional blocks in electronic device 100. As another example, in some embodiments, arbiter 118 is not a single functional block, but instead is or includes multiple separate arbiters arranged in a hierarchy (e.g., a tree or grid of sub-arbiters), with the multiple arbiters working together to control accesses of memory by respective clients as described herein. Generally, in the described embodiments, electronic device 100 includes sufficient functional blocks and elements arranged to perform the operations described herein.

Electronic device 100 can be, or can be included in, any device that performs the operations described herein. For example, electronic device 100 can be, or can be included in, a desktop computer, a laptop computer, a wearable computing device, a tablet computer, a piece of virtual reality or augmented reality equipment, a smart phone, an artificial intelligence (AI) or machine learning device, a server, a network appliance, a toy, a piece of audio-visual equipment, a home appliance, a vehicle, etc., and/or combinations thereof.

Management Entity

Figure 2:
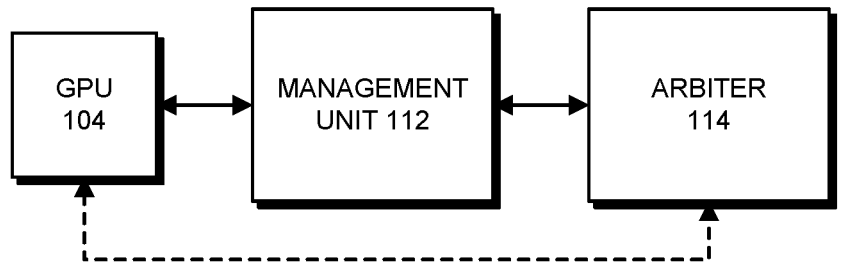
FIG. 2 presents a block diagram illustrating a management entity implemented in hardware in accordance with some embodiments.

In some embodiments, a management entity performs operations for determining sets of memory access bandwidths and configuring arbiter(s) (e.g., arbiter 118) to use the sets of memory access bandwidths for performing memory accesses for clients. In some of these embodiments, the management entity is implemented in hardware. In other words, the management entity is fabricated from circuitry that performs the above-described determining and configuring operations (and other operations). In some embodiments, the circuitry in the management entity is dedicated to performing the determining and configuring operations. FIG. 2 presents a block diagram illustrating a management entity implemented in hardware in accordance with some embodiments. As can be seen in FIG. 2, a client, i.e., graphics processing unit 104, possibly via driver 126 (not shown), interacts with management unit 112 (e.g., with a system management unit) and management unit 112 interacts with arbiter 118. In operation the client (i.e., the client itself, a driver associated with the client, and/or another hardware or software entity acting on behalf of the client) communicates requests for the allocation or release of memory access bandwidth allocation to management unit 112. For example, graphics processing unit 104 (or driver 126) may use a mailbox-interrupt mechanism for communicating requests to management unit 112 by writing information about the request to a shared "mailbox" memory element or location (e.g., a location in memory 114) and then asserting a specified interrupt to inform management unit 112 of the existence of the information about the request in the mailbox memory element or location. Upon receiving the interrupt, management unit 112 uses the information in the mailbox memory element or location to determine the sets of memory access bandwidths and configures arbiter 118 to use the sets of memory access bandwidths as described herein.

In some embodiments, as shown using the dashed line in FIG. 2, clients communicate more directly with arbiter 118 (possibly via drivers). In these embodiments, the clients therefore can themselves cause arbiter 118 to use sets of memory access bandwidths. For example, in some embodiments, the circuitry for performing the determining and configuring operations (and other operations) is included in the arbiter 118—and not in management unit 112 and/or another functional block.

Figure 3:
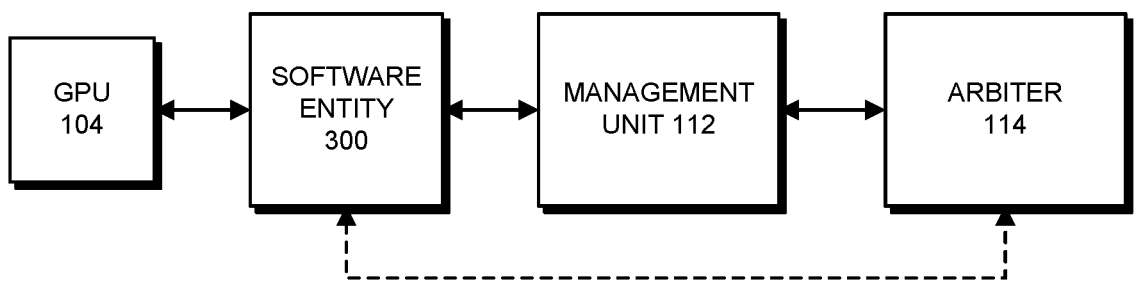
FIG. 3 presents a block diagram illustrating a management entity implemented using a combination of a software entity and hardware in accordance with some embodiments.

In some embodiments, and in contrast to what is shown in FIG. 2, the management entity is implemented using a combination of a software entity and hardware that perform the above-described determining and configuring operations (and other operations). In other words, at least some of the management entity is implemented using software, while the remainder of the management entity is fabricated from circuitry. FIG. 3 presents a block diagram illustrating a management entity implemented using a combination of a software entity and hardware in accordance with some embodiments. As can be seen in FIG. 3, a client, i.e., graphics processing unit 104, interacts with software entity 300 (e.g., a program, firmware, operating system routine, and/or other software entity), possibly via driver 126 (not shown), software entity 300 interacts with management unit 112, and management unit 112 interacts with arbiter 118. In operation, the client communicates requests for the allocation or release of memory access bandwidth allocation to software entity 300 (possibly via the respective driver). Software entity 300 then communicates information about the request to management unit 112. For example, software entity 300 may use a mailbox-interrupt mechanism for communicating requests to management unit 112 by writing information about the request to a shared "mailbox" memory element or location (e.g., a location in memory 114) and then asserting a designated interrupt to inform management unit 112 of the existence of the information about the request in the mailbox memory element or location. Management unit 112 then configures arbiter 118 to use sets of memory access bandwidths as described herein. In some of these embodiments, software entity 300 determines the sets of memory access bandwidths and communicates information about the sets of memory access bandwidths to management unit 112 to be used for configuring arbiter 118. In others of these embodiments, software entity 300 simply forwards requests from clients (or information based thereon) to management unit 112 and management unit 112 determines the sets of memory access bandwidths to be used for configuring arbiter 118.

In some embodiments, as shown using the dashed line in FIG. 3, software entity 300 communicates more directly with arbiter 118. In these embodiments, software entity 300 itself can cause arbiter 118 to use sets of memory access bandwidths. For example, in some embodiments, the software entity 300 can determine the sets of memory access bandwidth and then use mailbox-interrupts, request messages, and/or other communication mechanisms for configuring arbiter 118 to use the sets of memory access bandwidths. In some of these embodiments, circuitry for performing the configuring operations (and other operations) is included in the arbiter 118—and not in management unit 112 and/or another functional block.

Set of Memory Access Bandwidths

Figure 4:
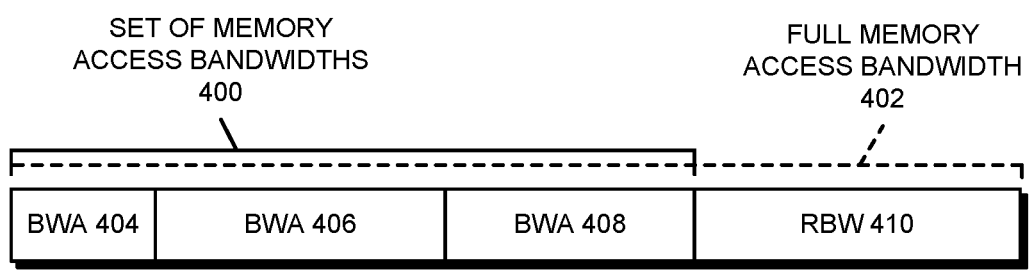
FIG. 4 presents a block diagram illustrating a set of memory access bandwidths in accordance with some embodiments.

In some embodiments, a management entity performs operations for determining sets of memory access bandwidths and configuring arbiter(s) (e.g., arbiter 118) to use the sets of memory access bandwidths for performing memory accesses for clients. Generally, the set of memory access bandwidths includes a memory access bandwidth allocation for each client that has requested or been automatically allocated memory access bandwidth and has not yet released the allocation. FIG. 4 presents a block diagram illustrating a set of memory access bandwidths 400 in accordance with some embodiments. Generally, set of memory access bandwidths 400 includes part of full memory access bandwidth 402. The particular part of full memory access bandwidth 402 of set of memory access bandwidths 400 is dictated by requests for allocations for memory access bandwidth by clients and/or in accordance with one or more other rules or guidelines. For example, in some embodiments, assuming that full memory access bandwidth 402 is 200 GB/s, the maximum part of full memory access bandwidth 402 that is permitted to be allocated to clients, and thus the maximum total bandwidth value of sets of memory access bandwidths 400, can be 120 GB/s, 150 GB/s or another value.

As can be seen in FIG. 4, set of memory access bandwidths 400 includes three memory access bandwidth allocations (BWA) 404-408. Each of memory access bandwidth allocations 404-408 represents memory access bandwidth that is allocated to, and thus reserved for the exclusive use of, a respective client (e.g., imaging interface 108, display interface 106, etc.). For example, assuming that full memory access bandwidth 402 is 100 GB/s, memory access bandwidth allocation 404 is 15 GB/s, memory access bandwidth allocation 406 is 30 GB/s, and memory access bandwidth allocation 408 is 25 GB/s, while the remaining access bandwidth (RBW) 410 is 30 GB/s.

In some embodiments, set of memory access bandwidths 400 does not always include the same number and/or arrangement of memory access bandwidths. In other words, not all memory access bandwidth allocations are statically assigned and/or, when statically assigned, always the same size. Instead, in some embodiments, memory access bandwidths are dynamically allocated and reallocated/reapportioned based on requests for memory access bandwidths from clients (i.e., from the clients themselves, from drivers associated with the clients, and/or from another hardware or software entity acting on behalf of the clients). For example, continuing the example in FIG. 4, memory access bandwidth allocation 408 may be a temporary memory access bandwidth allocation such as that requested by a client for performing a given operation and then subsequently released when the operation is completed. In these embodiments, memory access bandwidths, even statically allocated memory access bandwidths, may be resized/reapportioned in order to enable allocating memory access bandwidth to a requesting client while staying within a maximum bound for total allocated memory access bandwidth. For example, when a given client requests a memory access bandwidth allocation and an existing set of memory access bandwidths is already at the maximum allowable memory access bandwidth allocation, one or more of the already-allocated memory access bandwidths may be reduced in size (e.g., from X GB/s to Y GB/s, where X=50 or another number and Y=30 or another number) to make space in the set of memory access bandwidths for allocating the memory access bandwidth.

In some embodiments, functional blocks such as management unit 112 and/or arbiter 118 provide and/or receive information about sets of memory access bandwidths that is used for respective operations. For example, in some embodiments, arbiter 118 receives sets of memory access bandwidths from management unit 112. In these embodiments, the information about sets of memory access bandwidths includes information to be used for identifying clients to which memory access bandwidth has been allocated, as well as for determining the respective allocations of memory access bandwidths. For example, in some embodiments, the set of access bandwidths includes an identifier for each client to which memory access has been allocated such as a numerical identifier assigned to the client, a port number, an identifier for the client used in memory access requests, a bit at a particular position in a string of bits, etc.—and the allocatable/available memory access bandwidth is assumed to be equally allocated among the identified clients. As another example, in some embodiments, the set of access bandwidths includes an identifier for each client to which memory access bandwidth has been allocated such as a numerical identifier assigned to the client, a port number, an identifier for the client used in memory access requests, a bit at a particular position in a string of bits, etc., along with an indication of an amount of memory access bandwidth that is to be allocated to each client.

In some embodiments, the full memory access bandwidth of a memory is logically divided into a number of indivisible blocks or portions. For example, the full memory access bandwidth of the memory may be 100 GB/s and the blocks or portions, which can be called "virtual channels," are 5 GB/s. In these embodiments, when allocating memory access bandwidth to a given client, the memory access bandwidth is allocated as a number of the blocks or portions. Continuing the example, a given client can be allocated one or more 5 GB/s virtual channels.

Process for Allocating Memory Access Bandwidths

Figure 5:
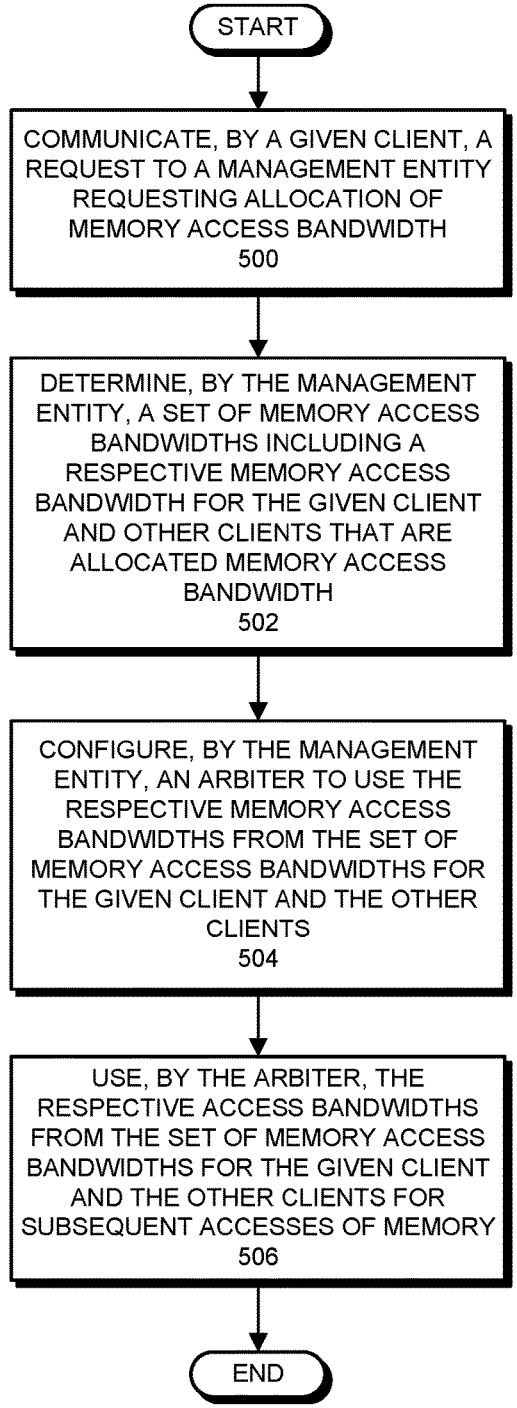
FIG. 5 presents a flowchart illustrating a process for determining and using sets of memory access bandwidths in accordance with some embodiments.

In the described embodiments, a management entity performs operations for determining sets of memory access bandwidths (e.g., set of memory access bandwidths 400) to be allocated to clients and configuring an arbiter (e.g., arbiter 118) to use the sets of memory access bandwidths for memory accesses. In other words, the management entity determines memory access bandwidths to be allocated to clients and then causes the arbiter to use the memory access bandwidths for subsequent memory accesses for the clients and other clients. FIG. 5 presents a flowchart illustrating a process for determining and using sets of memory access bandwidths in accordance with some embodiments. FIG. 5 is presented as a general example of functional blocks and operations performed by some embodiments. Some embodiments, however, include different functional blocks and/or different functional blocks perform the operations. In addition, some embodiments perform different operations and/or perform the operations in a different order.

In describing FIG. 5, a given client and other clients who are to be allocated memory access bandwidths are used for determining and using a set of memory access bandwidths. There may also be other clients who are not allocated memory access bandwidth, and thus vie with each other for the use of unallocated memory access bandwidth. For clarity, in describing FIG. 5, the other clients who are to be allocated memory access bandwidths are referred to as simply "other clients," while the clients who are not allocated memory access bandwidth are referred to as "non-allocated clients."

For describing FIG. 5, for clarity and brevity, a client is described as requesting the allocation of memory access bandwidth from a management entity. In some embodiments, however, the client itself (i.e., the hardware or circuitry of a hardware client) does not send the requests to the management entity. For example, in some embodiments, a driver for the client communicates requests for the allocation of memory access bandwidth to the management entity. As another example, in some embodiments, hardware or software entities acting on behalf of the client communicate requests for the allocation of memory access bandwidth to the management entity. Generally, in the described embodiments, requests for the allocation of memory access bandwidth for clients are received by the management entity and acted on by the management entity as described herein.

The operation in FIG. 5 starts when a given client (e.g., graphics processing unit 104) communicates, to a management entity (e.g., management unit 112), a request requesting the allocation of memory access bandwidth (step 500). For example, when the given client's use case changes (where the "use case" is or includes a workload profile, type of operation(s), type of memory access(es), etc.), the given client can request allocation of memory access bandwidth for the use case. For instance, a user may initiate an operation such as turning on a device or starting a given operation (e.g., streaming video, etc.) which causes a client's use case to change, leading to the client making a request for the allocation of memory access bandwidth. In some embodiments, the changing of the use case can serve as a cause or trigger for making the request for the allocation of memory access bandwidth. For this operation, in some embodiments, the given client itself, a driver associated with the given client, and/or another software or hardware entity acting on behalf of the given client communicates, to the management entity, a request for the allocation of memory access bandwidth. The request includes information that is useable by the management entity for identifying the client, determining that the given client desires the allocation of memory access bandwidth, and determining an amount of memory access bandwidth that the given client desires allocated. For example, in some embodiments, the request includes information about the use case for the given client. Generally, the use case includes one or more pieces of information that can be used by the management entity for directly or indirectly determining the amount of memory access bandwidth being requested by the given client for present, forthcoming, predicted, and/or anticipated memory accesses. For example, the use case may identify a specific memory access bandwidth (e.g., M Gb/s, where M=15 GB/s, 5 GB/s, or another value) or level of memory access bandwidth among two or more levels of memory access bandwidth. As another example, the use case may identify type(s) of memory accesses to be performed (e.g., read, write, etc.) and/or arrangement(s) of memory accesses (e.g., sequential, strided, scattered, etc.). As yet another example, the use case may identify a workload being or to be executed by the client, a software program or routine being or to be executed by the client, and/or type(s) of operations being or to be executed by the client. As yet another example, the use case may identify a priority of the client and/or a time for which memory accesses are likely to be performed.

In some embodiments, the request is communicated from the given client to the management entity in accordance with the communication interface and/or a communication protocol or standard in use between the given client and the management entity. In other words, the request is or includes one or more indicators such as bit sequences, variables, and/or other values that identify the client, indicate that the given client desires allocation of memory access bandwidth, indicate or represent the use case, and/or other information about the request. For example, the request may be in the form of a multi-bit request packet that is transmitted to the management entity via a serial or parallel communication route, and the client, the request for the allocation of memory access bandwidth, the use case, and possibly other information about the request can be identified by setting (to a logical value such as VSS) or clearing (to a logical low value such as VDD) respective bits in the packet. As another example, the request may be communicated via dedicated signal lines with one or more signal lines asserted (to a logical high value such as VSS) or deasserted (to a logical low value such as VDD) to indicate the request for the allocation of memory access bandwidth, the use case, and possibly other information. As yet another example, a driver for the given client (or the given client itself) can write information about the request to a "mailbox," or shared, memory location in memory 114 or in a dedicated memory element and then signal an interrupt to the management entity. As yet another example, in embodiments where the management entity includes a software entity, a driver for the given client (or the client itself) can communicate a request to the software entity via an operating system executing in the system—and the software entity can communicate the request to a hardware portion of the management entity via the above-described mailbox memory location/interrupt mechanism.

Upon receiving the request, the management entity determines a set of memory access bandwidths that includes a respective memory access bandwidth for the given client and the other clients (step 502). Generally, for this operation the management entity determines memory access bandwidths to be allocated to the given client and the other clients so that each of these clients has some memory access bandwidth allocated thereto. The "set" of memory access bandwidths therefore includes a respective memory access bandwidth allocation for each of the given client and the other clients. The particular memory access bandwidths that can be allocated to the given client and the other clients depend on the full memory access bandwidth that is provided by the memory and/or limitations or rules regarding a portion of the full memory access bandwidth that can be allocated to clients (i.e., a maximum allocatable memory access bandwidth). For example, in some embodiments, as much as a specified maximum memory access bandwidth of the full memory access bandwidth can be divided or otherwise apportioned to the given client and the other clients. For instance, if the full memory access bandwidth is 200 GB/s, then a specified maximum allocatable memory access bandwidth of 150 GB/s, 70 GB/s, or another value can be divided or otherwise apportioned to the given client and the other clients. Note, however, that less than all of the specified maximum allocatable memory access bandwidth may be allocated to clients at any given time. When less than all of the specified maximum allocatable memory access bandwidth is allocated to clients, the unallocated bandwidth is made available for performing memory accesses by non-allocated clients.

For determining the sets of memory access bandwidths, in some embodiments, when there is sufficient memory access bandwidth to be allocated to the given client and the other clients, the management entity determines a set of memory access bandwidths that includes a desired memory access bandwidth allocation for each of the given client and the other clients. In other words, when the desired memory access bandwidth allocation for each of the given client and the other clients sums to less than the maximum allocatable memory access bandwidth, the management entity simply provides each of the given client and the other clients with its desired memory access bandwidth allocation. For example, in some embodiments, the management entity uses the use case for the given client and the other clients (some of which may have statically-designated use cases, or, more simply, statically allocated memory access bandwidths) to determine a respective memory access bandwidth to be allocated to the given client and each of the other clients. In some embodiments, this operation includes the management entity performing a lookup in a table or other record or otherwise using circuitry (e.g., logic circuits, etc.) for determining the sets of memory access bandwidths. For example, the management entity can use cases for the given client and use case for other clients (or statically allocated memory access bandwidths for the other clients) to perform a lookup in a table that relates combinations of use cases to sets of memory access bandwidths. In some embodiments, the table that relates the combinations of use cases to sets of memory access bandwidths is compressed, simplified, or reduced in size to avoid an overly-large table when there are numerous use cases for the clients. The management entity then generates a set of memory access bandwidths that includes the respective memory access bandwidth allocation for the given client and each of the other clients.

In contrast to case described above, in some embodiments, in cases where allocating the desired memory access bandwidth to each of the given client and the other clients would result in more than a maximum allocatable memory access bandwidth being allocated, the management entity determines a set of memory access bandwidths in which the given client and the other clients are each allocated some of the maximum allocatable memory access bandwidth, but less than the given client's and/or the other client's desired memory access bandwidth. For example, when the other clients are already allocated memory access bandwidth that is too close to the maximum allocatable memory access bandwidth for the given client to be allocated all of the given client's desired memory access bandwidth, the management entity may allocate the given client the remainder of the maximum allocatable memory access bandwidth. For instance, in an embodiment where the full memory access bandwidth is 200 GB/s, if the maximum allocatable memory access bandwidth is 120 GB/s, the other clients have been allocated a total of 110 GB/s, and the given client desires 15 GB/s, the management entity may allocate the given client the remainder of 10 GB/s. This leaves the given client short of the desired memory access bandwidth, but provides at least some allocated memory access bandwidth to the given client.

As an alternative to allocating the given client the remainder of the maximum allocatable memory access bandwidth as described in the preceding paragraph, or when most or all of the maximum allocatable memory access bandwidth has already been allocated to the other clients, in some embodiments, the management entity "takes" or "borrows" allocated memory access bandwidths from one or more of the other clients to free up allocatable memory access bandwidth for use by the given client. In other words, the set of memory access bandwidths that is determined by the management entity includes an allocation of memory access bandwidth for the given client (and possibly some of the other clients) that was taken or borrowed from one or more of the other clients. For example, a particular one of the other clients may be allocated (and possibly statically allocated) a relatively large amount of memory access bandwidth in order to account for a "worse case," or higher level of memory accesses by that particular other client. The management entity may, however, reduce the memory access bandwidth allocation for that particular other client in order to allocate memory access bandwidth to the given client (and possibly other clients). For example, in an embodiment where the full memory access bandwidth is 100 GB/s, if the maximum allocatable memory access bandwidth is 70 GB/s and all 70 GB/s are allocated to other clients with the particular other client being allocated 15 GB/s, the management entity may reduce the memory access bandwidth allocation of the particular other client to 10 GB/s and allocate the freed-up 5 GB/s to the given client, thereby taking or borrowing the 5 GB/s from the particular other client. For this operation, the management entity can track memory access bandwidth allocation usage by the other clients to determine other clients that using less than their full allocated memory access bandwidth (e.g., are idle or powered down, have not been using their full memory access bandwidth allocation for a given time, are executing lower-intensity workloads, etc.) and can borrow memory access bandwidth from such other clients. Although taking or borrowing memory access bandwidth restricts the protected memory accesses of the particular other client, it is likely, given the worst-case allocation of memory access bandwidth to the particular other client, that the particular other client will not be performing sufficient memory accesses to consume the full allocated memory access bandwidth. In practice, therefore, the particular other client should not encounter any significant reduction in overall operating capacity. In some cases, borrowed memory access bandwidth is only allocated to the given client temporarily or for a relatively short time to enable a specific operation by the given client, and is then released (as described for FIG. 7) and can be reallocated to the particular other client.

The management entity then configures the arbiter to use the respective memory access bandwidths from the sets of memory access bandwidths for the given client and the other clients (step 504). For this operation, the management entity causes the arbiter to commence using the set of memory access bandwidths for performing memory accesses for the given client and the other clients. This can mean replacing an existing set of memory access bandwidths, if one exists, so that the arbiter begins using different memory access bandwidth allocations for clients and/or for different clients. In other words, in some embodiments, the arbiter may be using a first set of memory access bandwidths for performing memory accesses for clients, but the management entity may replace the first set of memory access bandwidths with a second set of memory access bandwidths. The management entity can therefore "dynamically" update sets of memory access bandwidths as the electronic device operates, which enables dynamic/real time adjustments to the memory access bandwidths allocated to clients in the electronic device.

The particular operations for configuring the arbiter to use the set of memory access bandwidths depend on the circuitry and arrangement of the arbiter. For example, in some embodiments, the management entity provides the set of memory access bandwidths to the arbiter and processing circuitry in the arbiter sets the arbiter to use the set of memory access bandwidths by updating per-client records of allocations in memory elements, setting register circuitry, adjusting memory access counters and/or timers, etc. As another example, in some embodiments, the arbiter exposes/provides or accesses configuration elements such as registers, shared memory locations or memory elements, etc., and the management entity writes (or overwrites) values in the configuration registers.

Figure 6:
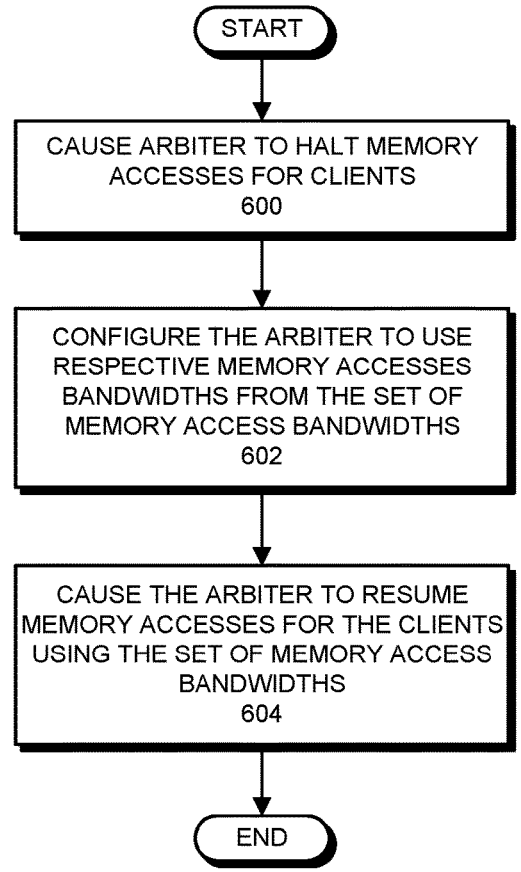
FIG. 6 presents a flowchart illustrating a process for configuring the arbiter to use a set of memory access bandwidths in accordance with some embodiments.

FIG. 6 presents a flowchart illustrating a process for configuring the arbiter to use a set of memory access bandwidths in accordance with some embodiments. FIG. 6 is presented as a general example of functional blocks and operations performed by some embodiments. Some embodiments, however, include different functional blocks and/or different functional blocks perform the operations. In addition, some embodiments perform different operations and/or perform the operations in a different order. As can be seen in FIG. 6, the management entity first causes the arbiter to halt memory accesses for clients (step 600). In other words, the management entity causes the arbiter not to send out, to the memory, buffered memory accesses and/or newly received memory accesses for the clients (the arbiter may, however, continue to buffer newly received memory accesses and otherwise handle existing and new memory accesses). For example, the management entity can assert a "stop memory access" signal or signal line to the arbiter. The management entity then configures the arbiter to use respective memory access bandwidths from the set of memory access bandwidths as described above (step 602). The management entity then causes the arbiter to resume memory accesses for the clients using the set of memory access bandwidths (step 604). For example, the management entity can deassert the "stop memory access" signal or signal line to the arbiter. In some embodiments, some or all of the above-described operations of the management entity are followed by acknowledgements (e.g., messages, signals, etc.) from the arbiter to the management entity to indicate that the arbiter has performed the respective operations. In these embodiments, the management entity may not perform a next operation until a previous operation has been acknowledged by the arbiter. For example, the management entity may await an acknowledgement from the arbiter that the memory accesses are halted (following step 600) before configuring the memory access bandwidths (step 602) and/or may await an acknowledgement that the arbiter has configured memory access bandwidths (following step 602) before causing the arbiter to resume memory accesses (step 604).

Returning to FIG. 5, the arbiter then uses respective memory access bandwidth allocations from the set of memory access bandwidths for the given client and the other clients for subsequent accesses of memory (step 506). For this operation, the arbiter ensures that the respective memory access bandwidth allocations for the given client and the other clients are reserved for the exclusive use of the given client and the other clients. Non-allocated clients, however, continue to vie for the remaining memory access bandwidth. For ensuring that the memory access bandwidth allocated to the given client and the other clients is protected, in some embodiments, the arbiter monitors memory accesses made by all of the clients and protects the allocated memory access bandwidth for a specific client from accesses by other clients. For example, the arbiter may keep a count of memory accesses for each client in the last N ms and use the counts for the clients to ensure that the clients are not impermissibly using the memory access bandwidth allocations in the set of memory access bandwidths. As another example, the arbiter may use credits or other tokens to track memory accesses by the clients.

Although the example in FIGS. 5-6 is presented using a single arbiter, in some embodiments, there are two or more arbiters present. For example, one or more sub-groups of functional blocks (e.g., central processing unit, display interface, etc.) may have their own arbiter that maintains memory access bandwidth controls, etc. In these embodiments, the operations performed by the management entity for configuring each of the arbiters to use the respective access bandwidths are similar to those shown in FIGS. 5-6, although the management entity may separately configure each of the two or more arbiters. In some of these embodiments, the above-described acknowledgements (i.e., from each of the arbiters to the management entity) help to keep the management entity and the two or more arbiters in a consistent operating state.

Process for Releasing Allocated Memory Access Bandwidths

Figure 7:
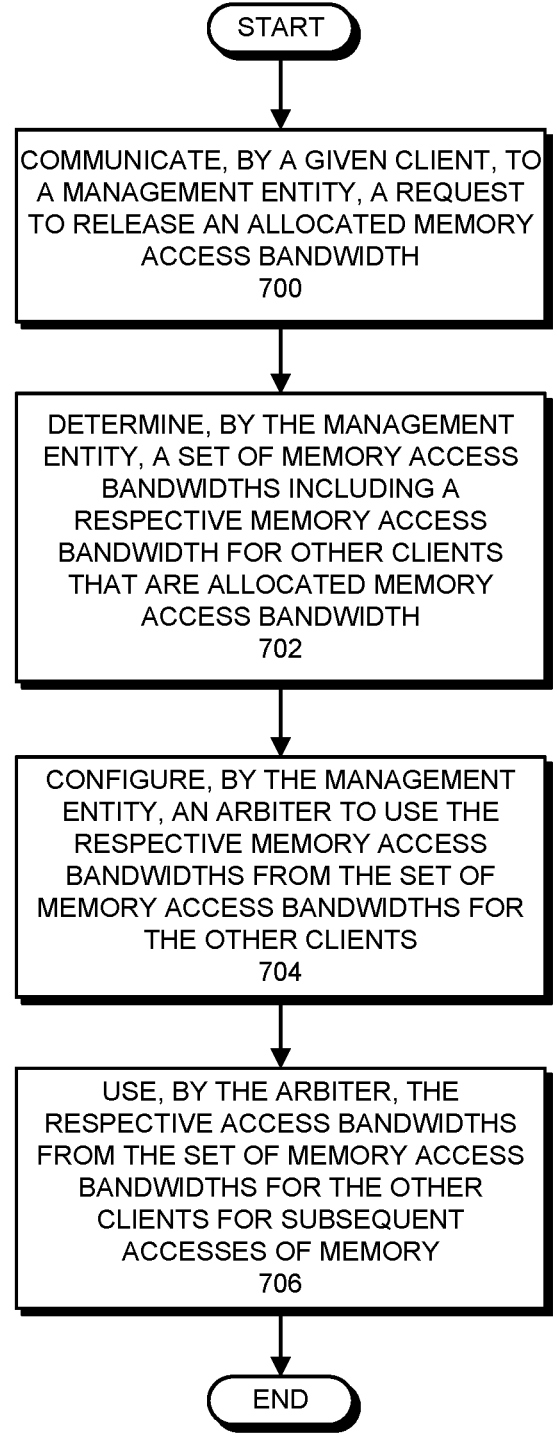
FIG. 7 presents a flowchart illustrating a process for releasing allocated memory access bandwidth in accordance with some embodiments.

In the described embodiments, a management entity performs operations for releasing memory access bandwidth that has been allocated to a client. In other words, following the allocation of memory access bandwidth to a given client, the management entity receives a request from the given client to release the allocated memory access bandwidth and releases the memory access bandwidth. FIG. 7 presents a flowchart illustrating a process for releasing allocated memory access bandwidth in accordance with some embodiments. FIG. 7 is presented as a general example of functional blocks and operations performed by some embodiments. Some embodiments, however, include different functional blocks and/or different functional blocks perform the operations. In addition, some embodiments perform different operations and/or perform the operations in a different order.

For the example in FIG. 7, it is assumed that an arbiter (e.g., arbiter 118) was previously configured to use respective memory access bandwidths from a set of memory access bandwidths for a given client and other clients who are to be allocated memory access bandwidths, e.g., by performing the operations in FIGS. 5-6. There may also be additional clients who are not allocated memory access bandwidth, and thus vie with each other for the use of unallocated memory access bandwidth. For clarity, the other clients who are to be allocated memory access bandwidths are referred to as simply "other clients," while the additional clients who are not allocated memory access bandwidth are referred to as "non-allocated clients."

For describing FIG. 7, for clarity and brevity, a client is described as requesting the release of an allocation of memory access bandwidth from a management entity. In some embodiments, however, the client itself (i.e., the hardware or circuitry of a hardware client) does not send the requests to the management entity. For example, in some embodiments, a driver for the client communicates requests for the release of allocated memory access bandwidth to the management entity. As another example, in some embodiments, hardware or software entities acting on behalf of the client communicate requests for the release of allocated memory access bandwidth to the management entity. Generally, in the described embodiments, requests for the release of allocations of memory access bandwidth for clients are received by the management entity and acted on by the management entity as described herein.

The operation in FIG. 7 starts when a given client (e.g., graphics processing unit 104) communicates, to a management entity (e.g., management unit 112), a request requesting the release of an allocated memory access bandwidth (step 700). For example, when the given client's use case changes (where the "use case" is or includes a workload profile, type of operation(s), type of memory access(es), etc.), the given client can request the release of an allocation of memory access bandwidth (i.e., to release memory access bandwidth that was previously being used for a prior use case). For instance, a user may initiate an operation such as turning off a device or ending a given operation (e.g., streaming video, etc.) which causes a client's use case to change, leading to the client making a request for the release of the allocation of memory access bandwidth. In some embodiments, the changing of the use case can serve as a cause or trigger for making the request for the release of the allocation of memory access bandwidth. For this operation, in some embodiments, the given client itself, a driver associated with the given client, and/or another software or hardware entity acting on behalf of the given client communicates, to the management entity, a request for the release of the allocated memory access bandwidth. The request includes information that is useable by the management entity for identifying the client and determining that the given client desires the release of allocated memory access bandwidth.

In some embodiments, the request is communicated from the given client to the management entity in accordance with the communication interface and/or a communication protocol or standard in use between the given client and the management entity. In other words, the request is or includes one or more indicators such as bit sequences, variables, and/or other values that identify the client, indicate that the given client desires the release of allocated memory access bandwidth, and/or other information about the request. For example, the request may be in the form of a multi-bit request packet that is transmitted to the management entity via a serial or parallel communication route, and the client, the request for the release of the allocated memory access bandwidth, and possibly other information about the request can be identified by setting (to a logical value such as VSS) or clearing (to a logical low value such as VDD) respective bits in the packet. As another example, the request may be communicated via dedicated signal lines with one or more signal lines asserted (to a logical high value such as VSS) or deasserted (to a logical low value such as VDD) to indicate the request for the release of the allocated memory access bandwidth and possibly other information. As yet another example, a driver for the given client (or the given client itself) can write information about the request to a "mailbox," or shared, memory location in memory 114 or in a dedicated memory element and then signal an interrupt to the management entity. As yet another example, in embodiments where the management entity includes a software entity, a driver for the given client (or the client itself) can communicate a request to the software entity via an operating system executing in the system—and the software entity can communicate the request to a hardware portion of the management entity via the above-described mailbox memory location/interrupt mechanism.

Upon receiving the request, the management entity determines a set of memory access bandwidths that includes a respective memory access bandwidth for the other clients (step 702). Generally, for this operation the management entity determines memory access bandwidths to be allocated to the other clients so that each of other clients has some memory access bandwidth allocated thereto. The "set" of memory access bandwidths therefore includes a respective memory access bandwidth allocation for each of the other clients—but no allocation for the given client. The particular memory access bandwidths that can be allocated to the other clients depend on the full memory access bandwidth that is provided by the memory and/or limitations or rules regarding a portion of the full memory access bandwidth that can be allocated to clients. For example, in some embodiments, as much as a specified maximum portion of the full memory access bandwidth can be divided or otherwise apportioned to the other clients. For instance, if the full memory access bandwidth is 200 GB/s, then a specified maximum portion of 150 GB/s, 70 GB/s, or another value can be divided or otherwise apportioned to the other clients. Note, however, that less than all of the specified maximum portion may be allocated to clients at any given time. When less than all of the specified maximum portion is allocated to clients, the unallocated memory access bandwidth is made available for performing memory accesses by non-allocated clients.

Generally, for determining the sets of memory access bandwidths in the case where there is sufficient memory access bandwidth for all of the other clients to be allocated their desired memory access bandwidth allocation or when there is insufficient memory access bandwidth (in view of a maximum allocatable memory access bandwidth) for all of the other clients to be allocated their desired memory access bandwidth, the management entity proceeds as described above for step 502 in FIG. 5. For example, the management entity can take or borrow memory access bandwidth from a particular other client in order to provide memory access bandwidth to one or more of the other clients, etc. The description of the details of the determining operation in these cases is not repeated here, however, for brevity and clarity.

The management entity then configures the arbiter to use the respective memory access bandwidths from the sets of memory access bandwidths for the other clients (step 704). For this operation, the management entity causes the arbiter to commence using the set of memory access bandwidths for performing memory accesses for the other clients. This means replacing the existing set of memory access bandwidths (recall that the arbiter was previously configured to use a set of memory access bandwidths), so that the arbiter begins using respective memory access bandwidth allocations for the other clients. The management entity therefore "dynamically" updates the set of memory access bandwidths based on the given client's request to release allocated memory access bandwidth as the electronic device operates.

The particular operations for configuring the arbiter to use the set of memory access bandwidths depend on the circuitry and arrangement of the arbiter. For example, in some embodiments, the management entity provides the set of memory access bandwidths to the arbiter and processing circuitry in the arbiter sets the arbiter to use the set of memory access bandwidths by updating per-client records of allocations in memory elements, setting register circuitry, adjusting memory access counters and/or timers, etc. As another example, in some embodiments, the arbiter exposes/provides or accesses configuration elements such as registers, shared memory locations or memory elements, etc., and the management entity writes (or overwrites) values in the configuration registers. FIG. 6, as described above, presents a flowchart illustrating a process for configuring the arbiter to use a set of memory access bandwidths in accordance with some embodiments.

The arbiter then uses respective memory access bandwidth allocations from the set of memory access bandwidths for the other clients for subsequent accesses of memory (step 706). For this operation, the arbiter ensures that the respective memory access bandwidth allocations for the other clients are reserved for the exclusive use of the other clients. Note that the given client, due to the release of the memory access bandwidth, is subsequently considered a non-allocated client. Non-allocated clients including the given client vie for the remaining memory access bandwidth. For ensuring that the memory access bandwidth allocated to the other clients is protected, in some embodiments, the arbiter monitors memory accesses made by all of the clients and protects the allocated memory access bandwidth for a specific client from accesses by other clients. For example, the arbiter may keep a count of memory accesses for each client in the last N ms and use the counts for the clients to ensure that the clients are not impermissibly using the memory access bandwidth allocations in the set of memory access bandwidths.

Although the example in FIG. 7 is presented using a single arbiter, in some embodiments, there are two or more arbiters present. For example, one or more sub-groups of functional blocks (e.g., central processing unit, display interface, etc.) may have their own arbiter that maintains memory access bandwidth controls, etc. In these embodiments, the operations performed by the management entity for configuring each of the arbiters to use the respective access bandwidths are similar to those shown in FIG. 7, although the management entity may separately configure each of the two or more arbiters. In some of these embodiments, acknowledgements such as those described for FIG. 6 (i.e., from each of the arbiters to the management entity) can be used to help to keep the management entity and the two or more arbiters in a consistent operating state.

Augmented Reality and Virtual Reality Processing

In some embodiments, hard real time clients, soft real time clients, and non-real time clients in an electronic device perform respective operations associated with presenting virtual reality (VR) or augmented reality (AR) information on displays (e.g., headsets, etc.). In other words, and using electronic device 100 as an example, in some embodiments, central processing unit 102, graphics processing unit 104, display interface 106, imaging interface 108, and/or input/output interface 110 are clients that perform respective parts of the operations for presenting streams of video (i.e., sequences of individual video frames) that include or are composed using the VR or AR information. Using AR as an example, the functional blocks work together to generate sequences of display images, or "frames," for display on a display that include a user's environment (e.g., a room in which the user is located) along with AR elements such as information about objects in the user's environment, virtual/graphical objects or overlays, etc. For generating each of the frames, the imaging interface 108 provides, to computer vision processing software executing on central processing unit 102 (or another functional block), one or more images captured by imaging device 122 from the electronic device 100's environment/surroundings. The computer vision processing software processes the images (and possibly other environmental data such as range information, user motion or controller input information, etc.) and generates information about AR elements to be displayed to the user on display 120. Central processing unit 102 then forwards the information about the AR elements to graphics processing unit 104 that composes frames to be displayed on display 120. Graphics processing unit 104 sends the frames to display interface 106, which forwards the frames to display 120 for display to the user. Because a large number of frames (e.g. 30 frames per second, etc.) are necessary to maintain a smooth appearance in the user's display, the functional blocks typically operate in a pipelined fashion, with the above-described information and data flowing through the various functional blocks in sequence as they perform their parts of frame-generating operations.

Allocation of Memory Access Bandwidth to Non-Real Time Clients

In some embodiments, non-real time clients (which are ordinarily not allocated memory access bandwidth) can request allocations of memory access bandwidth using the operations described herein. Continuing the AR example from the preceding section, in some embodiments, clients such as display interface 106 and imaging interface 108 can be treated as hard real time clients or soft real time clients due to an increased possibility of user-perceptible artifacts or errors in the streams of AR/VR video (e.g., tearing, jitters, frame drops, low resolution, etc.) given higher latency in accessing memory. Hard and soft real time clients can be allocated memory access bandwidth (and possibly statically allocated the memory access bandwidth) to ensure that the latency of accessing memory is kept lower—and thus user-perceptible artifacts in the output AR/VR video are minimized. Clients such as graphics processing unit 104, central processing unit 102, and input-output interface 110, on the other hand, can be treated as non-real time clients due to a reduced possibility of user-perceptible artifacts in the output stream of AR/VR video caused by longer latency for memory accesses. Non-real time clients are not ordinarily allocated memory access bandwidth. In some embodiments, however, non-real time clients such as graphics processing unit 104 can request the allocation of memory access bandwidth from management entity (e.g., management unit 112) for performing certain sub-operations during the generation of frames of AR/VR video that are associated with an increased possibility of being related to user-perceptible artifacts. In other words, while the graphics processing unit does not ordinarily have a need for allocated memory access bandwidth, operations relating to the generation of frames of AR/VR video, if performed using higher memory access latency, can introduce artifacts to the presentation of the frames of AR/VR video. The graphics processing unit therefore requests the allocation of memory access bandwidth for performing these operations.

Figure 8:
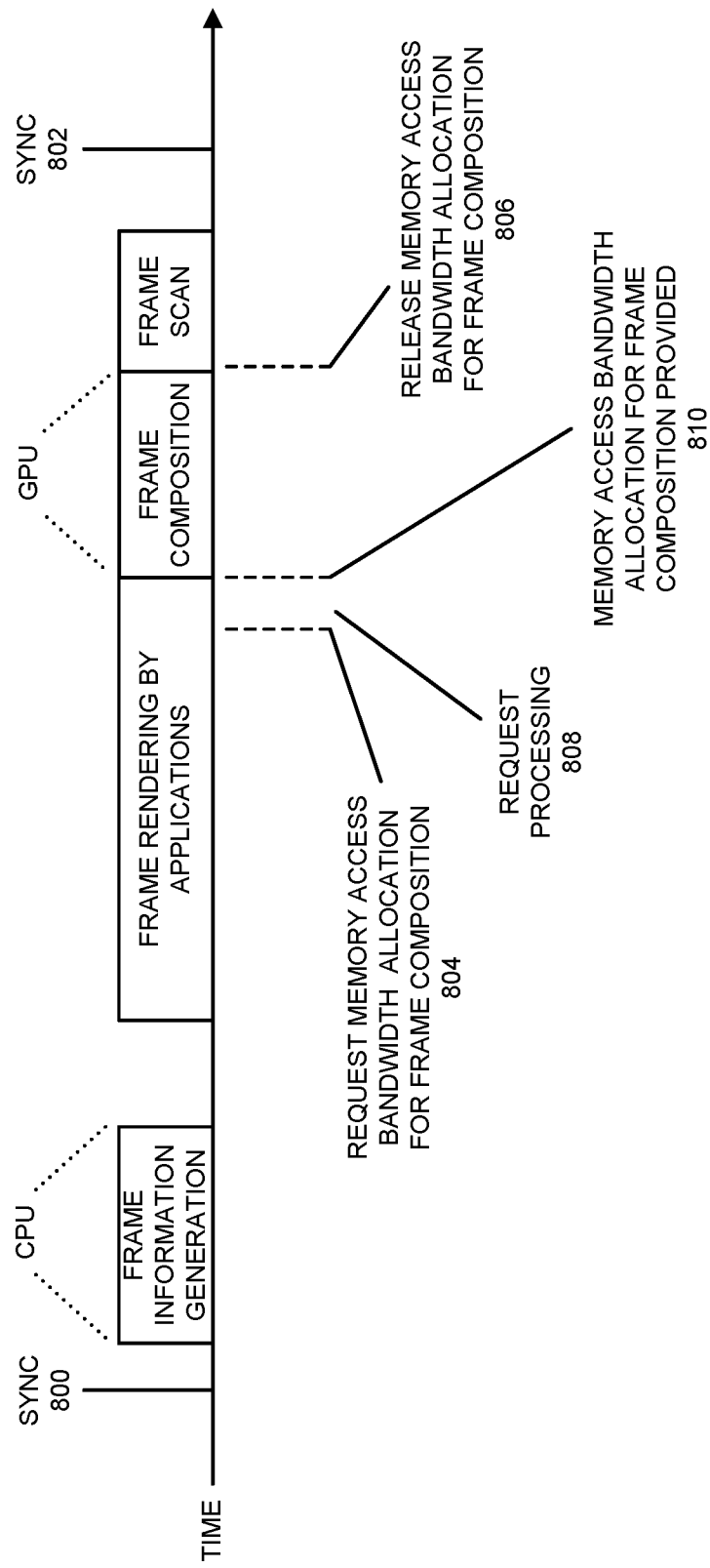
FIG. 8 presents a timeline diagram of a client requesting memory access bandwidth allocation for specified operations in accordance with some embodiments.

For describing FIG. 8, for clarity and brevity, a client is described as requesting the allocation of memory access bandwidth from a management entity. In some embodiments, however, the client itself (i.e., the hardware or circuitry of a hardware client) does not send the requests to the management entity. For example, in some embodiments, a driver for the client communicates requests for the allocation of memory access bandwidth to the management entity. As another example, in some embodiments, hardware or software entities acting on behalf of the client communicate requests for the allocation of memory access bandwidth to the management entity. Generally, in the described embodiments, requests for the allocation of memory access bandwidth for clients are received by the management entity and acted on by the management entity as described herein.

FIG. 8 presents a timeline diagram of a client requesting memory access bandwidth allocation for specified operations in accordance with some embodiments. For the example in FIG. 8, some of a set of operations associated with displaying AR information on a user's display are shown with time proceeding from left to right. The operations shown in FIG. 8 are performed by a central processing unit and a graphics processing unit, e.g., central processing unit 102 and graphics processing unit 104. FIG. 8 is presented as a general example of functional blocks and operations performed by some embodiments. Some embodiments, however, include different functional blocks and/or different functional blocks perform the operations. In addition, some embodiments perform different operations and/or perform the operations in a different order—or include other operations performed by other functional blocks such as display interface 106, imaging interface 108, etc.

As can be seen in FIG. 8, between syncs 800-802, which represent the occurrence of vertical synchronization (VSYNC) timing signals in a video stream (sequence of individual video frames), an application such as a computer vision application executed by the central processing unit (or another functional block) generates information for creating a frame of AR video (e.g., with AR elements, information, etc.). One or more applications executing on by the central processing unit (and/or other software/firmware entities) then render the frame of AR video. The central processing unit stores the frame rendering information in memory (e.g., memory 114), from where the graphics processing unit retrieves the information and uses the information in a frame composition operation for creating a frame of AR video. The graphics processing unit then stores the frame in the memory during a frame scan operation. The frame is then retrieved from the memory by the display interface and displayed on the display.

Because delay in accessing memory during the frame composition operation can lead to delay in providing frames of AR video, the AR video may include artifacts such as tearing, dropped frames, etc. when memory access latency is higher than a given latency. Given that the graphics processing unit is normally treated as a non-real time client, such latency can occur due to the graphics processing unit vying with other non-real time clients for remaining (i.e., otherwise non-allocated) memory access bandwidth. In some embodiments therefore, the graphics processing unit requests the allocation of memory access bandwidth for the frame composition operation. The graphics processing unit then releases the memory access bandwidth allocation at the end of the frame composition operation. This can be seen in FIG. 8 when the graphics processing unit requests memory access bandwidth allocation for frame composition 804 and then when the graphics processing unit releases the memory access bandwidth for frame composition 806. In some embodiments, the requesting and releasing operations proceed similarly to what is described above for FIGS. 5-7. For clarity and brevity, those operations are not described here.

As can also be seen in FIG. 8, there is a request processing 808 time between the request for memory access bandwidth allocation 804 and when the memory access bandwidth allocation is provided 810. In some embodiments, the non-real time client monitors and/or otherwise determines (e.g., via configuration values, requesting the request processing time from the management entity, etc.) the request processing time and sends the request sufficiently early (i.e., at time 804) that the memory access bandwidth allocation is provided at substantially the time when the frame composition job is commenced by the client. For example, if the request processing time is 10 ms, then the non-real time client can send the request 10 ms before the frame composition job is commenced so that the memory access bandwidth allocation is ready at the time the frame composition job is commenced.

In some embodiments, at least one electronic device (e.g., electronic device 100) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100, management unit 112, graphics processing unit 104, arbiter 118, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a memory;
a plurality of clients;
at least one arbiter circuit; and
a management circuit, wherein:
a given client of the plurality of clients communicates a request to the management circuit requesting an allocation of memory access bandwidth for accesses of the memory by the given client, the given client being a non-real-time client that is allocated memory access bandwidth on an as-needed basis;
the management circuit determines, based on the request, a set of memory access bandwidths including a respective memory access bandwidth for each of the given client and other clients of the plurality of clients that are allocated memory access bandwidth, the other clients including at least one real time client that is allocated memory access bandwidth on an ongoing basis; and
the management circuit configures the at least one arbiter circuit to use respective memory access bandwidths from the set of memory access bandwidths for the given client and the other clients for subsequent accesses of the memory.

2. The electronic device of claim 1, wherein:
the given client is a processor that performs graphics processing for a virtual or augmented reality system; and
the given client is configured to:
communicate the request to the management circuit requesting the allocation of the memory access bandwidth for a specified job among the graphics processing that is to be performed by the given client; and
communicate a subsequent request to the management circuit to relinquish the allocation of memory access bandwidth when the specified job completes.

3. The electronic device of claim 2, wherein the given client is further configured to:
determine a request time in advance of a time at which the given client is to commence the specified job for communicating the request to the management circuit so that the memory access bandwidth is allocated at the time at which the given client commences the specified job; and
communicate the request to the management circuit at the request time.

4. The electronic device of claim 1, wherein:
determining the set of memory access bandwidths includes reallocating previously-allocated memory access bandwidth from one or more of the other clients to the given client.

5. The electronic device of claim 1, further comprising:
a driver associated with the given client, wherein the driver is configured to communicate the request to the management circuit requesting the allocation of the memory access bandwidth for operations that are currently being performed by the given client or operations that are to be performed by the given client.

6. The electronic device of claim 1, wherein, when determining, based on the request, the set of memory access bandwidths, the management circuit is configured to:
acquire, from the request, an identifier for a use case for the given client; and
determine, based on the use case for the given client and use cases for the other clients, the set of memory access bandwidths, the determining comprising:
using a record that associates sets of memory access bandwidths with combinations of use cases for the given client and uses cases for the other clients to determine the set of memory access bandwidths.

7. The electronic device of claim 1, wherein, when configuring the at least one arbiter circuit, the management circuit is configured to:
cause the at least one arbiter circuit to halt memory accesses for the plurality of clients;
configure the at least one arbiter circuit to use the respective memory access bandwidths from the set of memory access bandwidths; and
cause the at least one arbiter circuit to resume memory accesses for the plurality of clients.

8. The electronic device of claim 1, wherein the plurality of clients includes:
one or more real time clients that are allocated memory access bandwidth on an ongoing basis; and
one or more non-real-time clients that are allocated memory access bandwidth on an as-needed basis.

9. The electronic device of claim 1, further comprising:
a management unit, wherein the management unit includes the management circuit.

10. The electronic device of claim 1, wherein:
the at least one arbiter circuit uses the respective memory access bandwidths from the set of memory access bandwidths for the given client and the other clients for subsequent accesses of the memory, the using comprising preventing other clients from using the respective memory access bandwidths from the set of memory access bandwidths.

11. A method for allocating memory access bandwidth to clients in an electronic device that includes a memory, a plurality of clients, at least one arbiter circuit, and a management circuit, the method comprising:
communicating, by a given client of the plurality of clients, a request to the management circuit requesting an allocation of memory access bandwidth for accesses of the memory by the given client, the given client being a non-real-time client that is allocated memory access bandwidth on an as-needed basis;
determining, by the management circuit, based on the request, a set of memory access bandwidths including a respective memory access bandwidth for each of the given client and other clients of the plurality of clients that are allocated memory access bandwidth, the other clients including at least one real time client that is allocated memory access bandwidth on an ongoing basis; and
configuring, by the management circuit, the at least one arbiter circuit to use respective memory access bandwidths from the set of memory access bandwidths for the given client and the other clients for subsequent accesses of the memory.

12. The method of claim 11, wherein:
the given client is a processor that performs graphics processing for a virtual or augmented reality system; and the method further comprises:
   communicating the request to the management circuit requesting the allocation of the memory access bandwidth for a specified job among the graphics processing that is to be performed by the given client; and
   communicating a subsequent request to the management circuit to relinquish the allocation of memory access bandwidth when the specified job completes.

13. The method of claim 12, wherein the method further comprises:
   determining, by the given client, a request time in advance of a time at which the given client is to commence the specified job for communicating the request to the management circuit so that the memory access bandwidth is allocated at the time at which the given client commences the specified job; and
   communicating, by the given client, the request to the management circuit at the request time.

14. The method of claim 11, wherein determining the set of memory access bandwidths includes reallocating previously-allocated memory access bandwidth from one or more of the other clients to the given client.

15. The method of claim 11, wherein:
   the electronic device includes a driver associated with the given client; and
   the method further comprises:
      communicating, by the driver, the request to the management circuit requesting the allocation of the memory access bandwidth.

16. The method of claim 11, wherein determining, based on the request, the set of memory access bandwidths comprises:
   acquiring, by the management circuit, from the request, an identifier for a use case for the given client; and
   determining, by the management circuit, based on the use case for the given client and use cases for the other clients, the set of memory access bandwidths, the determining comprising:
      using a record that associates sets of memory access bandwidths with combinations of use cases for the given client and uses cases for the other clients to determine the set of memory access bandwidths.

17. The method of claim 11, wherein configuring the at least one arbiter circuit comprises:
   causing, by the management circuit, the at least one arbiter circuit to halt memory accesses for the plurality of clients;
   configuring, by the management circuit, the at least one arbiter circuit to use the respective memory access bandwidths from the set of memory access bandwidths; and
   causing, by the management circuit, the at least one arbiter circuit to resume memory accesses for the plurality of clients.

18. The method of claim 11, wherein the plurality of clients includes:
   one or more real time clients that are statically allocated memory access bandwidth; and
   one or more non-real-time clients that are allocated memory access bandwidth based on requests for the allocation of memory access bandwidth.

19. The method of claim 11, wherein the electronic device includes a management unit that includes the management circuit.

20. The method of claim 11, wherein the method further comprises:
   using, by the at least one arbiter circuit, the respective memory access bandwidths from the set of memory access bandwidths for the given client and the other clients for subsequent accesses of the memory, the using comprising preventing other clients from using the respective memory access bandwidths from the set of memory access bandwidths.

* * * * *